(12) United States Patent
Jang (10) Patent No.: US 9,852,110 B2
(45) Date of Patent: Dec. 26, 2017

(54) APPARATUS FOR CONTROLLING INVERSE FAST FOURIER TRANSFORM INPUT IN LONG TERM EVOLUTION SYSTEM

(71) Applicant: Electronics and Telecommunications Research Institute, Daejeon (KR)

(72) Inventor: In Gul Jang, Gyeryong-si (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 71 days.

(21) Appl. No.: 14/982,846

(22) Filed: Dec. 29, 2015

(65) Prior Publication Data
US 2016/0210265 A1 Jul. 21, 2016

(30) Foreign Application Priority Data
Jan. 21, 2015 (KR) .................. 10-2015-0009738

(51) Int. Cl.
*G06F 17/14* (2006.01)
*H04L 27/00* (2006.01)

(52) U.S. Cl.
CPC ............ *G06F 17/142* (2013.01); *H04L 27/00* (2013.01)

(58) Field of Classification Search
CPC .............................. G06F 17/142; H04L 27/00
USPC ........................................................ 708/409
See application file for complete search history.

(56) References Cited

U.S. PATENT DOCUMENTS

| 7,849,123 B2* | 12/2010 | Lai ................. G06F 17/142 708/400 |
| 2007/0288542 A1 | 12/2007 | Shih et al. |
| 2010/0149963 A1 | 6/2010 | Bae et al. |
| 2011/0164490 A1* | 7/2011 | Hwang ............... H04L 27/263 370/210 |

(Continued)

FOREIGN PATENT DOCUMENTS

| JP | 62130467 A | * | 6/1987 |
| KR | 1020090016680 A | | 2/2009 |

(Continued)

OTHER PUBLICATIONS

In-Gul Jang et al., "Hardware efficient IFFT Design for OFDM in LTE Systems," The Korean Institute of Communications and Information Sciences Special Issue on 2014 Winter Conference, Jan. 22, 2014, pp. 426-427.

*Primary Examiner* — Tan V. Mai
(74) *Attorney, Agent, or Firm* — William Park & Associates Ltd.

(57) ABSTRACT

Disclosed is an apparatus for controlling an IFFT input in a LTE system. The apparatus includes: a first multiplexer configured to select a portion of data applied to a first stage of a Fast Fourier Transform (FFT) structure according to a predefined condition from among input data, and assign the selected data to a memory of the first stage; a butterfly operator configured to receive the portion of data selected by the first multiplexer and perform a butterfly operation for the first stage of the FFT structure using the received data; a multiplier configured to output a value obtained by multiplying a result value output from the butterfly operator and a predetermined value together; and a second multiplexer configured to receive a value output via the multiplier, and remaining data not selected by the first multiplexer to output to a second stage of the FFT structure.

10 Claims, 6 Drawing Sheets

(56) References Cited

U.S. PATENT DOCUMENTS

2012/0166508 A1    6/2012   Kim et al.
2016/0092399 A1*   3/2016   Chen ..................... G06F 17/142
                                                                                  708/404

FOREIGN PATENT DOCUMENTS

| KR | 1020090127462 A | 12/2009 |
|---|---|---|
| KR | 101259044 B1 | 4/2013 |

\* cited by examiner

FIG.6

APPARATUS FOR CONTROLLING INVERSE FAST FOURIER TRANSFORM INPUT IN LONG TERM EVOLUTION SYSTEM

CROSS-REFERENCE TO RELATED APPLICATION

This application claims the benefit of priority to Korean Patent Application No. 10-2015-0009738, filed on Jan. 21, 2015 in the Korean Intellectual Property Office, the disclosure of which is incorporated herein in its entirety by reference.

BACKGROUND OF THE INVENTION

Field of the Invention

The present disclosure relates to an apparatus for controlling an Inverse Fast Fourier Transform input in a Long Term Evolution system, and more particularly, to a technology for reducing a memory size, a latency, and an addition/subtraction operation of a butterfly in a first stage of Inverse Fast Fourier Transform.

Description of the Related Art

Since Orthogonal Frequency Division Multiplexing (OFDM) which is one of multi-carrier transmission methods has a robust performance in an environment such as a multipath fading channel, it is widely used in various wireless communication technologies. The OFDM is adopted as a standard of a Long Term Evolution (LTE) system of a 3rd Generation Partnership Project (3GPP).

A Fast Fourier Transform (FFT) processor is one of important factors in an aspect of physical layer implementation in various wireless communication systems as it requires a large area and power consumption. Meanwhile, various studies for improving the performance of Fast Fourier Transform have been progressed. However, most studies have focused on the problem of reducing the complexity of a multiplier.

SUMMARY OF THE INVENTION

The present disclosure has been made in view of the above problems, and provides an apparatus for controlling an IFFT input of a Long Term Evolution system to reduce a memory size of IFFT, a latency, and a butterfly operation by removing a NULL signal of an FFT input for a first stage of IFFT.

In accordance with an aspect of the present disclosure, an apparatus for controlling an Inverse Fast Fourier Transform (IFFT) input in a Long Term Evolution system (LTE) system includes: a first multiplexer configured to select a portion of data applied to a first stage of a Fast Fourier Transform (FFT) structure according to a predefined condition from among input data, and assign the selected data to a memory of the first stage; a butterfly operator configured to receive the portion of data selected by the first multiplexer and perform a butterfly operation for the first stage of the FFT structure using the received data; a multiplier configured to output a value obtained by multiplying a result value output from the butterfly operator and a predetermined value together; and a second multiplexer configured to receive a value output via the multiplier, and remaining data not selected by the first multiplexer to output to a second stage of the FFT structure. The first multiplexer excludes data corresponding to ½ size of Null among data corresponding to ½ of total symbols of the received data, and selects remaining data to assign to the memory of the first stage. The first multiplexer excludes data corresponding to ½ size of Null among data corresponding to ½ of total symbols of the received data after a specified clock, and selects remaining data to assign to the butterfly operation of the first stage. The butterfly operator stores the data input into the first stage in the memory through the first multiplexer, and performs an addition operation and a subtraction operation with respect to data inputted after specified clock and the data previously stored in the memory. The butterfly operator, as a result of the butterfly operation, stores a subtraction value in the memory of the first stage, and outputs an addition value to the multiplier. The memory stores a subtraction value output from the butterfly operator, and feedbacks the stored value to the butterfly operator after specified clock. The subtraction value stored in the memory is output to the second stage after a certain clock. The multiplier performs multiplying operation with respect to an operation value output from the butterfly operator and a predetermined complex value. The butterfly operator is implemented by a RADIX-2 typed single path feedback structure, and performs a RADIX-2 butterfly operation with respect to data input from the first multiplexer.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
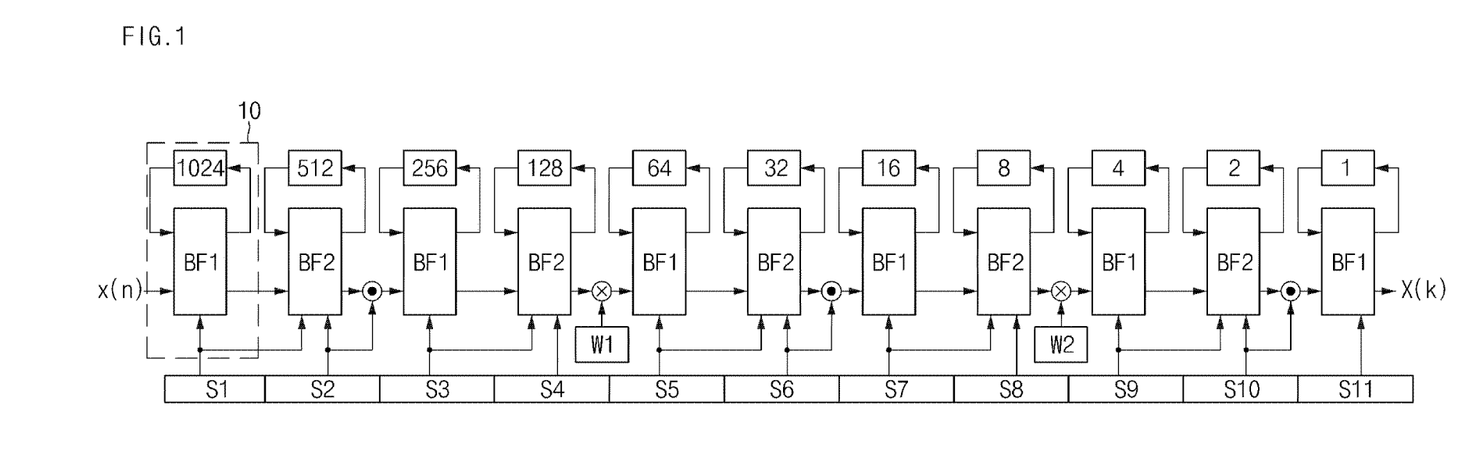
FIG. 1 is a diagram illustrating a FFT structure of a LTE system according to the present disclosure.

FIG. 1 is a diagram illustrating a FFT structure of a LTE system according to the present disclosure.

FIG. 1 illustrates an embodiment of a FFT structure based on Radix-$2^i$ Single-path Delay Feedback (SDF).

The present disclosure suggests a technology for reducing memory which occupies the largest area in FFT and consumes large power, i.e., memory in a first stage of the FFT structure by using a fact that a Null signal is widely used as a FFT input in a LTE system.

An interval of a subcarrier used in Orthogonal Frequency Division Multiplexing (OFDM) may be determined depending on each system, and the number of the subcarrier changes according to a total transmission bandwidth in a state in which radiation characteristic is considered in addition to the bandwidth.

In a 3rd-Generation Partnership Project (3GPP) LTE system, a system which has a frequency interval of 15 kHz and a bandwidth of 20 MHz may have 1200 subcarriers. Therefore, FFT of N=2,048 points may be selected.

The 2048-point FFT processor may load data into maximum 100 RB (=1200 subcarrier) and transmit the data in consideration of the characteristic of a RF filter. Here, since the 2048-point FFT processor uses a guard band, as in an embodiment of FIG. 4, 848 (=2048-1200) Nulls may be entered as an Inverse Fast Fourier Transform (IFFT) input. In addition, the position of the Null ('0') is located in the center of the IFFT, and, using this, the size of memory and the number of Butterfly operation may be reduced.

The Radix-2 based N-point FFT may have a memory depth of N/2 size in a first stage 10. An OFDM symbol input to the IFFT may be sequentially input to a memory of N/2 size to accomplish an operation. The LTE system supporting a 20 MHz BW may use a 2048 point FFT. In this case, the memory depth of the first stage (stage 1) may be reduced by controlling an IFFT input data sequence of a transmitter. Thus, the number of addition/subtraction Butterfly operation and latency may be also reduced.

Figure 2:
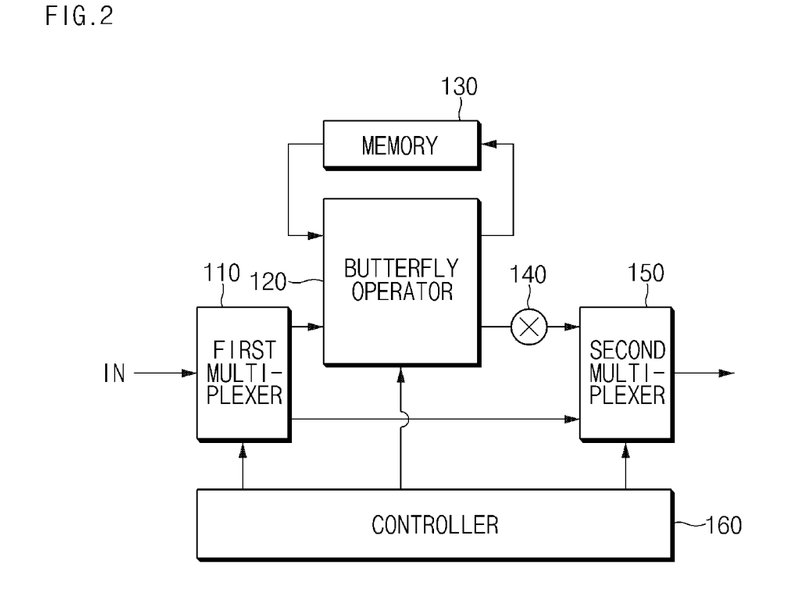
FIG. 2 is a diagram illustrating an apparatus for controlling an IFFT input in a LTE system according to the present disclosure.
Figure 3:
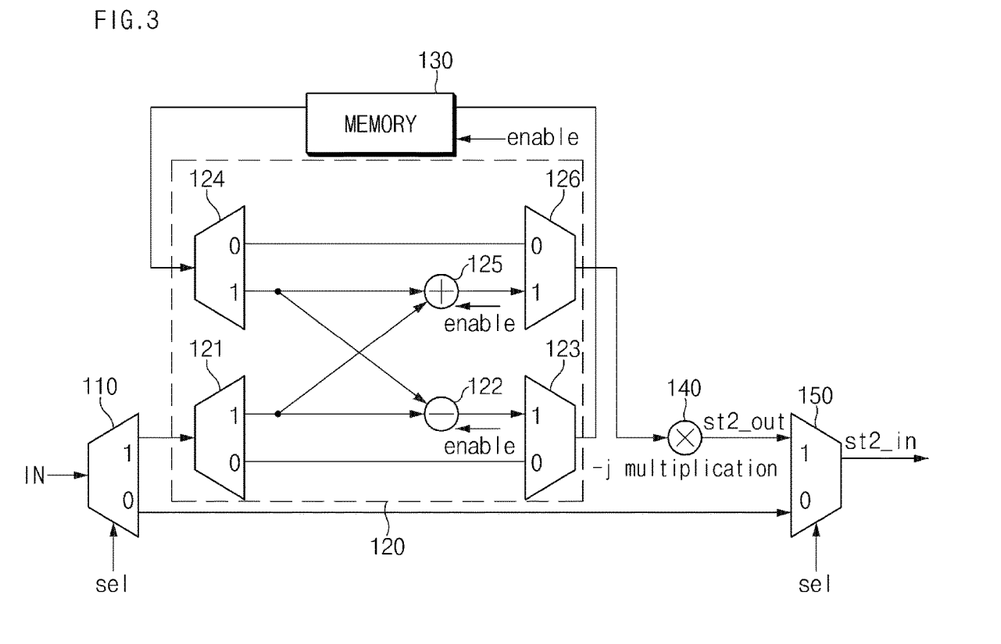
FIG. 3 is a diagram illustrating a detailed configuration of an apparatus for controlling an IFFT input in the LTE system of FIG. 2.

FIG. 2 is a diagram illustrating an apparatus for controlling an IFFT input in a LTE system according to the present disclosure, and FIG. 3 is a diagram illustrating a detailed configuration of an apparatus for controlling an IFFT input in the LTE system of FIG. 2.

Here, the apparatus (hereinafter, referred to as "control apparatus") for controlling an IFFT input in the LTE system according to the present disclosure is described based on an operation structure of an initial part (stage 1) of the FFT structure in the LTE system.

Referring to FIG. 2 and FIG. 3, the apparatus (hereinafter, referred to as "control apparatus") for controlling an IFFT input in the LTE system according to the present disclosure may include a first multiplexer (MUX) 110, a butterfly operator 120, a memory 130, a multiplier 140, a second multiplexer (MUX) 150, and a controller 160.

The first multiplexer (MUX) 110 may be controlled by the controller 160, select a portion of input data to provide to the butterfly operator 120, and provide remaining data to the second multiplexer (MUX) 150. Here, the remaining data may be stored in a memory (not shown) of stage 2 through the second multiplexer (MUX) 150.

For example, when the size of the input data is 'A' and the Null Size is B, the first multiplexer (MUX) 110 may provide data corresponding to A-B/2 to the butterfly operator 120, and provide data corresponding to remaining B/2 to the second multiplexer (MUX) 150.

The butterfly operator 120 may perform the butterfly operation on the data received from the first multiplexer (MUX) 110. At this time, the butterfly operator 120 may perform the butterfly operation on stage 1 in the FFT structure.

Here, the butterfly operator 120, which has a RADIX-2 Single-path Delay Feedback (SDF) structure, may perform a RADIX-2 butterfly operation with respect to the data received from the first multiplexer (MUX) 110, and output a result value to the multiplier 140 connected to the memory 130 or the second multiplexer (MUX) 150.

For example, as a result of the butterfly operation of the input data, the butterfly operator 120 may store a subtraction value into the memory 130 of stage 1, and output an addition value to the multiplier 140 connected to the second multiplexer (MUX) 150.

For example, the butterfly operator 120 may provide and store a half of total points, i.e., N/2 (=1024) input data, which are inputted in the first stage of a 2048-point FFT structure to the memory 130. Thereafter, addition and subtraction operations may be performed with respect to remaining N/2(=1024) data which are input after N/2 (=1024) clock and the N/2(=1024) input data which are previously stored in a corresponding memory 130.

At this time, the butterfly operator 120 may output and store the result of the subtraction operation, i.e., a subtraction value, in the memory 130 and output the result of the addition operation, i.e., an addition value, to the multiplier 140. Here, the addition value may be stored in the memory (not shown) of a second stage (stage 2) via the second multiplexer (MUX) 150. In addition, the subtraction value may be input to stage 2 after a predetermined time, e.g., 1024 clock.

The memory 130, which is a feedback memory, may store a result value output from the butterfly operator 120, and feed back the stored value to the butterfly operator 120.

For example, the memory 130 may store a half of total points, i.e., N/2 input data, in the first stage of N-point FFT structure, and then, store again the subtraction result with respect to remaining N/2 data which are input after N/2 clock and the N/2 input data which are previously stored in the memory 130.

The multiplier 140 may multiply the result value output from the butterfly operator 120 to a predetermined specific value, e.g., '-j' to output to the second multiplexer (MUX) 150.

The second multiplexer (MUX) 150 may be controlled by the controller 160, and may select the value output from the multiplier 140 or some of the data that are directly input from the first multiplexer 110 without passing through the butterfly operator 120 to output as an input data of stage 2.

The controller 160 may perform a control for an internal configuration unit of the butterfly operator 120, e.g., a multiplexer 121, 123, 124, 126, a subtractor 122, and an adder 125, and may control the first multiplexer (MUX) 110, the multiplier 140, and the second multiplexer (MUX) 150.

Figure 4:
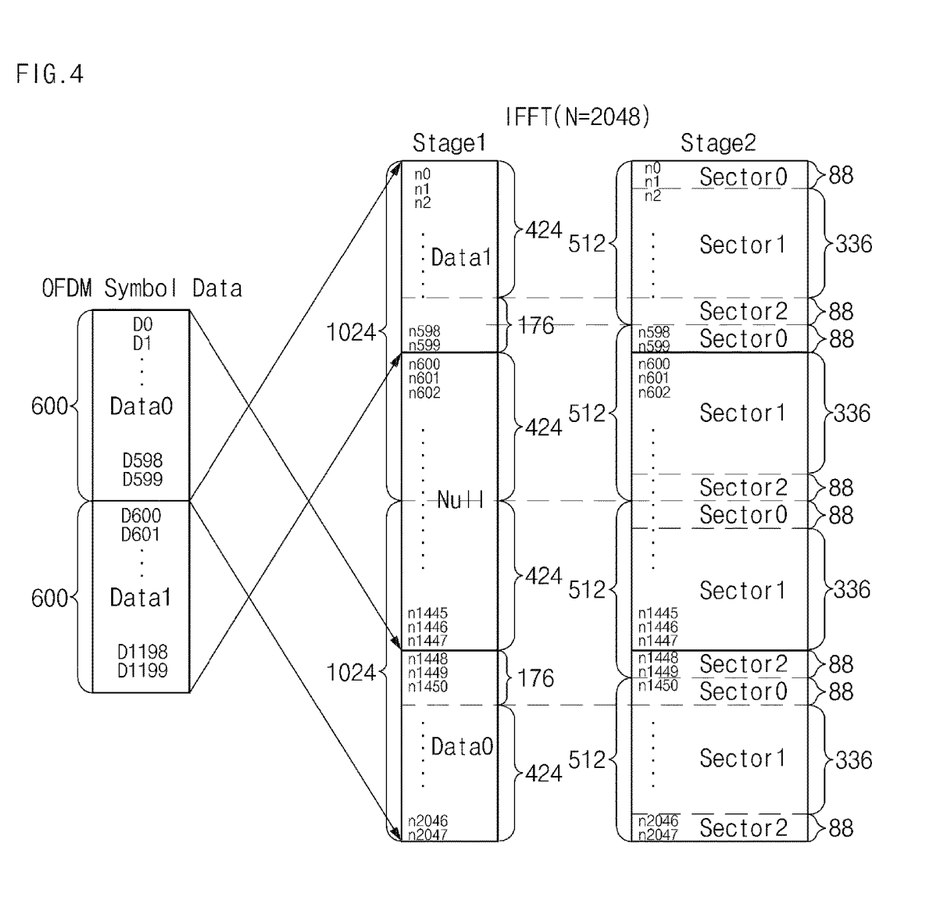
FIG. 4 is a diagram illustrating an embodiment of an input control operation of an apparatus for controlling an IFFT input in a LTE system according to an embodiment of the present disclosure.

FIG. 4 is a diagram illustrating an embodiment of an input control operation of an apparatus for controlling an IFFT input in a LTE system according to an embodiment of the present disclosure, and, in particular, illustrates a change in a data structure in terms of memory.

Referring to the embodiment of FIG. 4, the subcarrier in the 3GPP LTE system may have a frequency interval of 15 kHz, and may have 1,200 subcarriers in a system having a bandwidth of 20 MHz. Therefore, FFT of N=2,048 points may be selected. The FFT processor of 2,048 point may load data to maximum 100RB (=1,200 subcarrier) in consideration of the characteristic of the RF filter. In this case, since the FFT processor of 2,048 point uses a Guard band, as shown in FIG. 4, the 848 Nulls as an input of IFFT may be included in the center of the sub-carriers.

Therefore, in the present disclosure, it is intended that the size of the memory and the number of the butterfly operation may be reduced by using the fact that Null ('0') is located in the center of the IFFT.

Since the embodiment of FIG. 4 is based on the 2048-point FFT structure, the total memory size N may be 2048, and symbol data stored in a Resource Mapper may have a size of 2×A. Here, A is the size of the data, and, for example, 2×A=1200. In this case, symbol data corresponding to an upper portion A, i.e., 600, may be Data0, and a lower portion A, i.e., 600, may be Data1. In this case, it is assumed that Null size B is 848. In the 2048-point FFT structure, the memory of stage 1 may have a memory depth of a half size of the total memory size, i.e., N/2=1024.

At this time, when the positions of the Data0 and the Data 1 are exchanged to be input to stage 1, the memory of stage 1 may allocate the 600 data 'D600 to D1199 (size 600)' corresponding to the Data1 to a memory area of a size corresponding to 'n0 to n1023'. In this case, in the embodiment of FIG. 4, the memory of stage 1 may store a value obtained by subtracting the half of Null size from the size of the Data1 among 600 data contained in the Data1, that is, store only A−B/2=600−(848/2)=176 data, 'D1024 to D1199', in 'n424 to n599' area. Meanwhile, the remaining 424 data of 600 data, 'D600 to D1023', may be bypassed from the first multiplexer (MUX) and provided to the second multiplexer. In this case, the 424 data may be input to stage 2 through the second multiplexer. Here, a part of the data input to stage 2 may be selected by the controller, and the selected data may be stored in the memory of stage 2 and some data which are not selected may be used in the butterfly operation of stage 2. In this case, in the 2048-point FFT structure, the memory depth of stage 1 for the Data1 may be reduced from 1024 to 176, and thus it is possible to minimize the memory size of stage 1 and the number of the butterfly operation.

Here, the total latency of the conventional FFT is N(=2048) clock latency generated in the structure in which bit reverse does not exist. However, in the case of IFFT of the present disclosure, an output of IFFT may be output after N/2+A−B/2(=1200) clock latency. Accordingly, the present disclosure may be able to reduce the delay generated in the 2048-point FFT structure.

Meanwhile, the Data0 is data for operation, and 176 data, 'D0 to D175', among the data of Data0, 'D0 to D599 (size 600)', may be input to stage 1 by the first multiplexer. At this time, the input 176 data of the Data0 may accomplish a butterfly operation with 176 data of Data1 which are previously stored in the memory. As a result of the butterfly operation, the subtraction value may be stored in the memory of stage 1, and the addition value may be provided to stage 2 and be applied to the butterfly operation of stage 2.

Therefore, as shown in FIG. 4, for the Data 1, the memory of stage 2 may store 512 data including 424 data which are by passed by the first multiplexer, and 88 data which are used for the addition operation among 176 data of Data 1. Here, since the data stored in the memory of stage 2 does not contain Null, it is possible to minimize the number of the butterfly operation.

Figure 5:
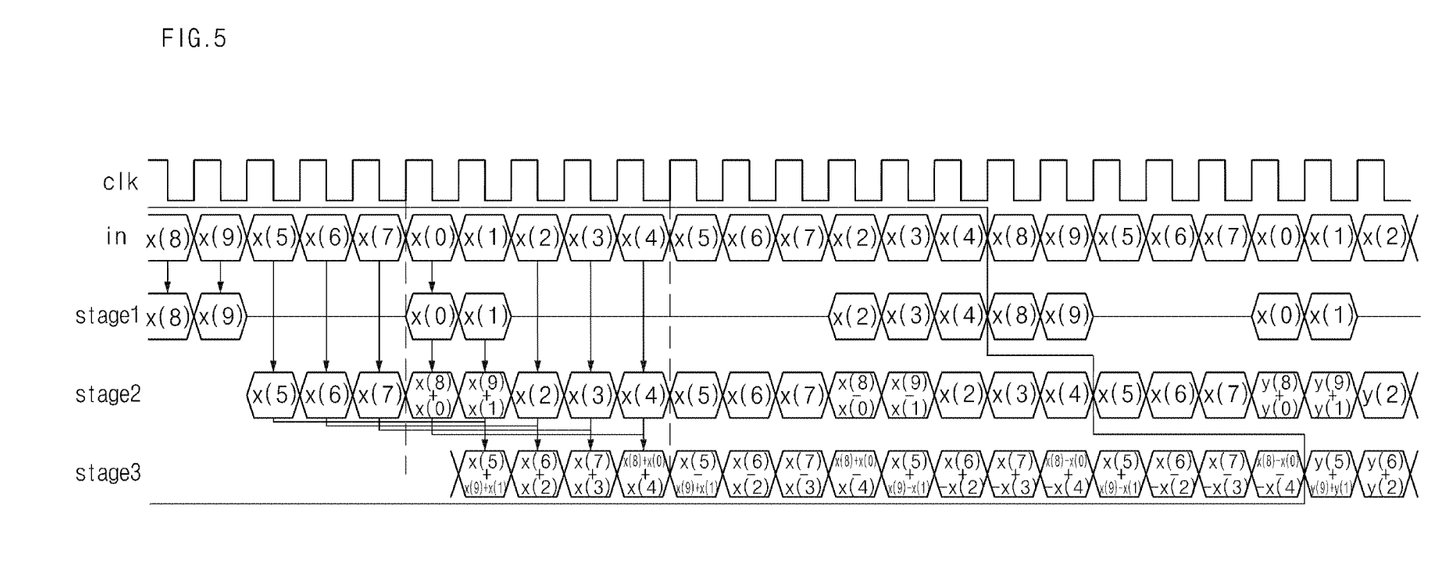
FIG. 5 is a diagram illustrating an embodiment of an operation processing of an apparatus for controlling an IFFT input in a LTE system according to an embodiment of the present disclosure.

FIG. 5 is a diagram illustrating an embodiment of an operation processing of an apparatus for controlling an IFFT input in a LTE system according to an embodiment of the present disclosure.

Here, the embodiment of FIG. 5 illustrates a 16-point FFT data timing diagram in the case of data size A=5 and Null size B=6. The order of the FFT input data may be adjusted to be input, as shown in FIG. 5, in the order of x(8), x(9), x(5), x(6), x(7), x(0), x(1), x(2), x(3), x(4), x(5), x(6), x(7), x(2), x(3), x(4), etc instead of sequentially inputting the data in the order of x(0), x(1), x(2), etc.

In other words, the input data are a symbol data stored in Resource Mapper, and may be usually input in the order of x(5), x(6), x(7), x(8), x(9), Null, . . . , Null, x(0), x(1), x(2), x(3), x(4), etc. However, in the present disclosure, the input order may be adjusted in order to minimize the number of operation, latency, and the like.

According to the embodiment of FIG. 5, as the FFT input starts, A−B/2=2 data, i.e., data x(8), x(9) may be selected from the index A+B/2=8 by the multiplexer, and the selected data x(8), x(9) may be continuously input to stage 1 and stored in the memory. Here, excluding two data x(8), x(9) which are input to stage 1 among five data, remaining three (=B/2) data x(5), x(6), x(7) may be input to stage 2.

Thereafter, data from x(0) to A−B/2=2, i.e., two data x(0), x(1) may be input again to stage 1, and addition, subtraction butterfly operations may be performed together with x(8), x(9) stored in the memory.

Here, the addition operation 'x(8)+x(0)' and 'x(9)+x(1)' may be stored in the memory of stage 2 during (A−B/2)/2 clock (CLK), and the subtraction operation 'x(8)−x(0)' and 'x(9)−x(1)' may be stored in the memory of stage 1 and then be input to stage 2 after N/2(=16/2=8) clock.

Then, B(=6) data from x(2), i.e., x(2), x(3), x(4), x(5), x(6), x(7) may be input to stage 2, and B/2=3 data from x(2), i.e., x(2), x(3), x(4) may be input to stage 1.

In this manner, the butterfly operation of stage 1 may be performed for 16 data, and then, after stage 2, the same operation as in the conventional radix-2 based FFT may be performed.

Figure 6:
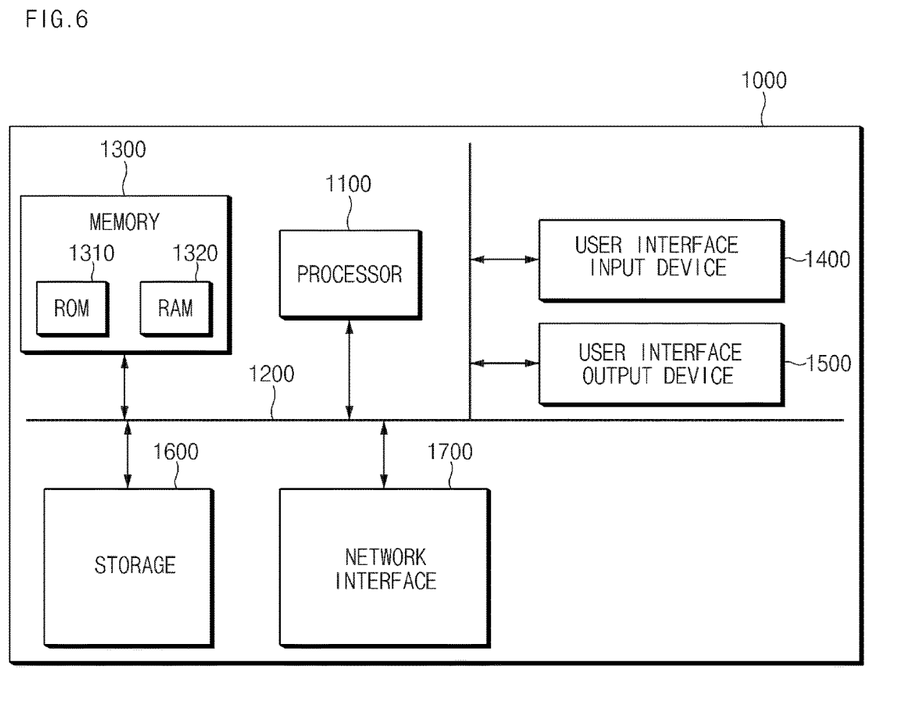
FIG. 6 is a diagram illustrating a computing system applying an apparatus according to the present disclosure.

FIG. 6 is a diagram illustrating a computing system applying an apparatus according to the present disclosure.

Referring to FIG. 6, a computing system 1000 may include at least one processor 1100 which is connected via a bus 1200, memory 1300, an user interface input device 1400, an user interface output device 1500, a storage 1600, and a network interface 1700.

The processor 1100 may be a semiconductor device for performing a processing for instructions stored in a central processing unit (CPU) or the memory 1300 and/or the storage 1600. The memory 1300 and the storage 1600 may include various types of volatile and nonvolatile storage media. For example, the memory 1300 may include a Read Only Memory (ROM) and Random Access Memory (RAM).

Thus, the steps of the method or the algorithm described in association with the embodiments disclosed herein may be directly implemented by a hardware, a software module, or a combination of the two executed by the processor 1100. The software module may reside in a storage medium (i.e., in the memory 1300 and/or the storage 1600) such as a RAM memory, a flash memory, a ROM memory, an EPROM memory, an EEPROM memory, a register, a hard disk, a removable disk, and CD-ROM. The exemplary storage medium may be coupled to the processor 1100, and the processor 1100 may read information from the storage medium and write information to the storage medium. Alternatively, the storage medium may be integrated in the processor 1100. The processor and the storage medium may reside in an application specific integrated circuit (ASIC). The ASIC may reside in a user terminal. Alternatively, the processor and the storage medium may reside in the user terminal as an individual component.

As described above, the present disclosure may reduce the memory size, the latency, and the addition/subtraction operation in the first stage. In addition, the present disclosure may reduce the memory size from the data which are bypassed in the first stage, and reduce access to the data, thereby reducing the power consumption.

In addition, the present disclosure may not fetch sequentially the symbol data stored in Resource Mapper of a transmitter as an IFFT input, but apply the proposed rule to input the data to the FFT in the modified order, thereby providing an optimized IFFT input control apparatus.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling an Inverse Fast Fourier Transform (IFFT) input in a wireless communication system, the apparatus comprising:
    a first multiplexer configured to select a portion of data applied to a first stage of a Fast Fourier Transform (FFT) structure according to a predefined condition from among input data, and assign remaining data following the portion of the data to a memory of a second stage of the FFT structure, wherein the remaining data is data which is not selected by the first multiplexer;
    a butterfly operator configured to receive the portion of the data selected by the first multiplexer and perform a butterfly operation for the first stage of the FFT structure using the received data;
    a multiplier configured to output a value obtained by multiplying a result value output from the butterfly operator and a predetermined value together; and
    a second multiplexer configured to receive a value output via the multiplier and the remaining data to output to the second stage,
    wherein the portion of the data has a size of A-B/2 and the remaining data has a size B/2, wherein A represent a size of the symbol data, B represents a size of null data, and 2A represent a size of a total symbol data.

2. The apparatus of claim 1, wherein the first multiplexer selects the portion of the data after a specified clock, and selects the remaining data to assign to the memory of the second stage.

3. The apparatus of claim 1, wherein the butterfly operator stores the portion of the data in a memory of the first stage through the first multiplexer, and performs an addition operation and a subtraction operation with respect to data inputted after specified clock and data previously stored in the memory of the first stage.

4. The apparatus of claim 1, wherein the butterfly operator stores a subtraction value in a memory of the first stage as a result of the butterfly operation, and outputs an addition value to the multiplier.

5. The apparatus of claim 1, wherein a memory of the first stage stores a subtraction value output from the butterfly operator, and feedbacks the stored value to the butterfly operator after specified clock.

6. The apparatus of claim 5, wherein the subtraction value stored in the memory of the first stage is output to the second stage after a certain clock.

7. The apparatus of claim 5, wherein the multiplier performs multiplying operation with respect to an operation value output from the butterfly operator and a predetermined complex value.

8. The apparatus of claim 5, wherein the butterfly operator is implemented by a RADIX-2 typed single path feedback structure, and performs a RADIX-2 butterfly operation with respect to data input from the first multiplexer.

9. A method for controlling an Inverse Fast Fourier Transform (IFFT) input in a wireless communication system, the method comprising:
    sending symbol data of which a size is A-B/2 to a first stage of a IFFT structure and then, sending remaining symbol data of B/2 to the first stage, wherein A represent a size of the symbol data, B represents a size of null data, and 2A represent a size of a total symbol data input to the IFFT structure; and
    forwarding the symbol data of A-B/2 to a butterfly operator according to a predefined condition, and assigning the remaining symbol data to a memory of a second stage of the FFT structure.

10. The method of claim 9, further comprising:
    receiving the forwarded data and performing a butterfly operation for the first stage using the forwarded data;
    outputting a value obtained by multiplying a result value output from the butterfly operator and a predetermined value together; and
    receiving a value output via the multiplier and the remaining data which is assigned by a first multiplexer in the first stage to output to the second stage.

* * * * *